:::
(12) United States Patent
Kurtz et al.

(10) Patent No.: US 7,530,274 B2
(45) Date of Patent: *May 12, 2009

(54) APPARATUS FOR PROVIDING AN OUTPUT PROPORTIONAL TO PRESSURE DIVIDED BY TEMPERATURE (P/T)

(75) Inventors: Anthony D. Kurtz, Saddle River, NJ (US); Joesph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 75 days.

This patent is subject to a terminal disclaimer.

(21) Appl. No.: 11/512,469

(22) Filed: Aug. 30, 2006

(65) Prior Publication Data

US 2007/0295095 A1 Dec. 27, 2007

Related U.S. Application Data

(63) Continuation-in-part of application No. 11/431,167, filed on May 9, 2006, now Pat. No. 7,347,098.

(51) Int. Cl.
*G01L 7/00* (2006.01)
(52) U.S. Cl. ........................................................ 73/714
(58) Field of Classification Search ................... 73/714, 73/25.01
See application file for complete search history.

(56) References Cited

U.S. PATENT DOCUMENTS 4,395,915 A * 8/1983 Singh ............................ 73/720
4,766,763 A * 8/1988 Kurtz ........................... 73/49.2
5,428,985 A * 7/1995 Kurtz et al. ................. 73/25.01
6,369,712 B2 * 4/2002 Letkomiller et al. ..... 340/572.1
2001/0004236 A1 * 6/2001 Letkomiller et al. ..... 340/572.1

* cited by examiner

*Primary Examiner*—Andre J Allen
(74) *Attorney, Agent, or Firm*—The Plevy Law Firm (57) ABSTRACT

A circuit produces an output that is proportional to the molar density of gas in a chamber. The circuit employs an operational amplifier which measures the temperature using a RTD or other element that changes resistance with temperature. The RTD is placed such that it produces a decreasing current draw at the inverting input of the operational amplifier as the temperature increases. This decreasing current draw in turn produces a decreasing voltage at the output of the operational amplifier. By changing the ratio of resistors connected to the non-inverting terminal of the operational amplifier one changes the offset of the output voltage. By changing the feedback resistor connected from the output of the operational amplifier to the inverting terminal and connecting the output of the inverting terminal to a voltage divider including the RTD device, one can change the gain with temperature. Thus the output voltage of the operational amplifier is carefully controlled to be proportional to 1/T for many different temperature scales and ranges. The output of the amplifier serves as the biasing voltage for a pressure transducer to provide a first output proportional to P/T. A second pressure transducer provides a second output proportional to P only.

26 Claims, 4 Drawing Sheets

APPARATUS FOR PROVIDING AN OUTPUT PROPORTIONAL TO PRESSURE DIVIDED BY TEMPERATURE (P/T)

RELATED APPLICATION

This application is a continuation-in-part of U.S. patent application Ser. No. 11/431,167, entitled APPARATUS FOR PROVIDING AN OUTPUT PROPORTIONAL TO PRESSURE DIVIDED BY TEMPERATURE (P/T), filed May 9, 2006 now U.S. Pat. No. 7,347,098, the entire disclosure of which is hereby incorporated by reference.

FIELD OF THE INVENTION

This invention relates to apparatus for providing a first output proportional to pressure divided by temperature and a second output proportional to only pressure more particularly to provide the outputs for monitoring the molar density of a gas in a container.

BACKGROUND OF THE INVENTION

It is well known that a gas, at relatively low pressures and temperatures, conforms well to the ideal gas law; $PV=nRT$. In this equation, P is the pressure, V is the volume, n is the number of moles of the gas, R is the Rydberg or universal gas constant and T is the temperature. This formula can be rearranged to yield $nR/V=P/T$, where the left side of the equation is the molar density of the system. This is useful because one can see that if the volume of a cavity does not change, it is possible to detect a leak in the cavity based on the simple ratio of pressure over temperature. This concept has been used in the past, and there are a number of patents which are assigned to Kulite Semiconductor Products, Inc., the assignee herein, which relate to such apparatus. See for example, U.S. Pat. No. 4,766,763 issued on Aug. 30, 1988 entitled "Gas Leak Detection Apparatus and Methods" by A. D. Kurtz the inventor herein. That patent discloses a gas leak detector employing pressure transducers. In one embodiment, the pressure in a vessel is monitored by means of a pressure transducer. The output of the pressure transducer is coupled to an operational amplifier, where the amplifier has a gain which is proportional to 1/T absolute. Thus, since the gain is inversely proportional to temperature, the amplifier produces an output which is independent of temperature but which is capable of providing a pressure indication when there is a gas leak in the container. See also U.S. Pat. No. 5,428,985 issued on Jul. 4, 1995 to A. D. Kurtz et al., and assigned to the assignee herein. That patent is also entitled "Gas Leak Detection Apparatus and Methods" and shows an improved gas leak detection apparatus for detecting a leak in a vessel. The apparatus uses a pressure transducer, an amplifier and feedback which operates to effectively and accurately model the VanderWaal equation of gases. The apparatus is adaptable for operation with any number of different gases by simply changing the values of specific circuit elements. In that patent there is also disclosed the above noted formulas as well as modifications of the same. See also U.S. Pat. No. 6,935,184 issued Aug. 30, 2005, to A. D. Kurtz and entitled "Pressure Transducer Capable of Detecting Internal Leakage of External Media". That patent describes a pressure transducer which has a first header containing a first pressure sensor for measuring pressure of the media. A second header contains a second pressure sensor and is disposed at the second end of a spacer. The spacer and the header assembly is formed with a sealed leak detection cavity for capturing the media that leaks past the first header.

Thus, it is apparent that using pressure transducers to detect leaks in various containers and vessels is well known as indicated by the above noted materials. The present invention is a circuit which produces an output which is proportional to pressure over temperature for use in leak detection and situations with relatively low pressures and temperature such as those pressures found in an automobile tire or other chamber. Additionally, some circumstances may require that despite detecting the ratio of P/T as a means of determining pressure leaks, the pressure must be determined independently. Such determination may be needed in for example in the landing decision of an aircraft, that although a tire may have a leak, to decide whether a safe landing is possible.

SUMMARY OF THE INVENTION

Apparatus for providing an output proportional to pressure (P) divided by temperature (T) (P/T) comprising: an operational amplifier having an inverting input terminal (−), a non-inverting input terminal (+) and an output terminal, a pressure transducer having a bridge array including at least one piezoresistive element and having a voltage biasing terminal coupled to one arm of the bridge with the other arm adapted to be connected to a point of reference potential, with the output of the bridge taken between the center terminal of each bridge arm, means for connecting the output terminal of the operational amplifier to the voltage biasing terminal, a first voltage divider including a resistor element which varies resistance according to temperature (RTD) in series with a first fixed resistor (R3), with one terminal of the fixed resistor adapted to be connected to a source of voltage ($V_{in}$) with the other terminal of the first resistor connected to one terminal of the resistor element to form a common junction with the other terminal of the resistor element connected to a point of reference potential, with the common junction connected to the inverting input terminal of the operational amplifier, a second voltage divider having a second (R1) and third resistor (R2) in series between a first terminal adapted to be connected to the source of voltage ($V_{in}$) and a second terminal adapted to be connected to a point of reference potential, with the common junction between the second and third resistors connected to the non-inverting terminal of the operational amplifier, a feedback resistor (R4) connected between the output terminal of the operational amplifier and the inverting terminal whereby the gain of the amplifier changes with temperature, and where the second and third resistors change the offset of the output voltage of the amplifier to cause the amplifier to provide an output voltage at the output terminal directly proportional to 1/T and therefore to cause the pressure transducer to provide an output proportional to P/T.

DETAILED DESCRIPTION OF THE INVENTION

Figure 1:
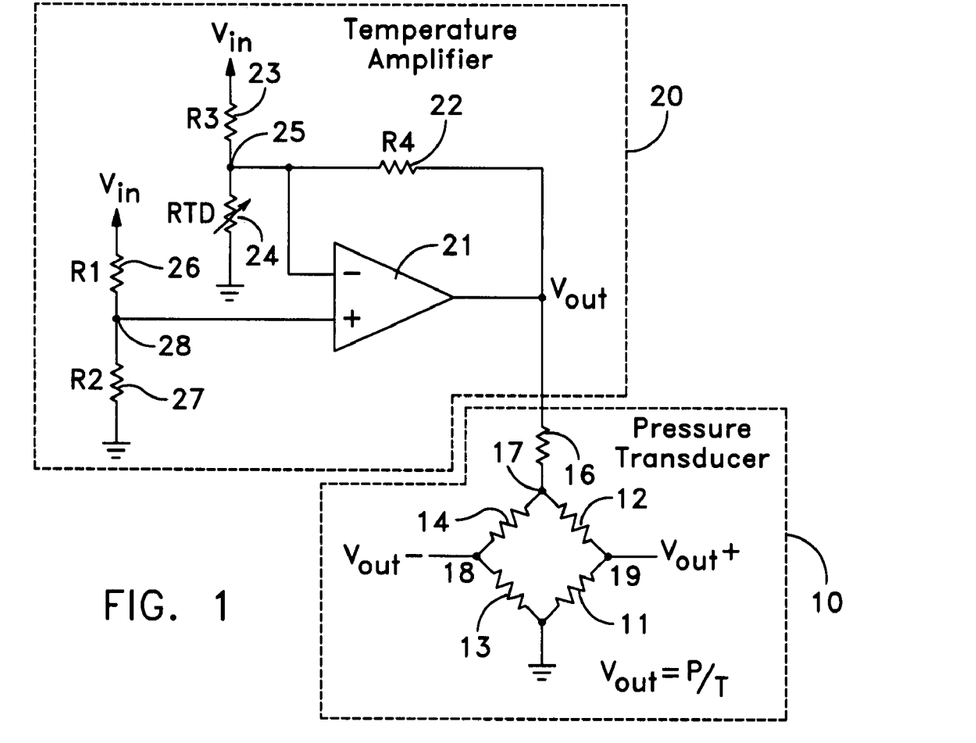
FIG. 1 is a schematic view of a circuit for providing an output proportional to pressure divided by temperature according to an embodiment of the present invention.

According to an embodiment of the present invention, two stages may be provided. Referring to FIG. 1, there is shown in a dashed line the two stages such an embodiment. Reference numeral 10 refers to a pressure transducer stage, which essentially includes a device having pressure sensors, such as sensors being disposed on a deflectable diaphragm. The pressure sensors, as for example 11, 12, 13 and 14 may be piezoresistive devices which are deposited or otherwise formed on a semiconductor or other diaphragm, and operate to change resistance according to a pressure applied to the diaphragm. There are many patents which are assigned to the assignee herein which describe such devices and any particular pressure transducer can be employed in pressure transducer stage 10. Examples of such transducers are shown in U.S. Pat. No. 6,363,792, entitled "Ultra-High Temperature Transducer Structure" issued on Apr. 2, 2002 to A. D. Kurtz et al. and assigned to the assignee herein, and U.S. Pat. No. 6,530,282, entitled "Ultra High Temperature Transducer Structure".

Connected to the transducer, via a resistor 16, is the output of a temperature amplifier circuit stage 20. The temperature amplifier circuit stage 20 includes an operational amplifier 21, whose output is connected to one terminal of resistor 16. The other terminal of resistor 16 is connected to a biasing terminal 17 of a Wheatstone bridge configuration including resistors 11, 12, 13 and 14 of pressure transducer stage 10. The output from the bridge is taken between terminals 18 and 19 designated as $V_{out-}$ and $V_{out+}$. In one configuration, the resistors 11, 12, 13 and 14 are configured as variable resistors. In another configuration, the resistors 13, 14 are variable resistors, while resistors 11, 12 are fixed resistors. In the configuration where all four resistors 11, 12, 13, 14 are variable resistors, the output (e.g., the difference between $V_{out-}$ and $V_{out+}$) is twice that of the two variable resistor case. The output of operational amplifier 21 is connected to the bridge via resistor 16 and also is connected to a feedback resistor 22 (R4). The feedback resistor 22 goes from the output to the negative input terminal of the operational amplifier 21. This is a conventional feedback resistor which essentially determines the gain of operational amplifier 21. The negative or inverting input terminal of amplified 21 is further coupled to a voltage divider consisting of resistors 23 (R3) and 24 (RTD). Resistor 24 is a resistance whose value changes with temperature and may take the format of a resistance thermal detector (RTD). Other types of devices which provide a resistance change with temperature may be used such as thermistors.

In any event, resistors 23 and 24 form a voltage divider whose common terminal 25 is connected to the negative input terminal of operational amplifier 21. The voltage divider, consisting of resistances 23 and 24, is coupled to a voltage input source, designated $V_{in}$, while the other terminal of resistor 24 is connected to a reference potential or ground. Coupled to the positive, or non-inverting input terminal of operational amplifier 21, is another voltage divider consisting of resistors 26 and 27 (R1 and R2). The resistors 26 and 27 are also coupled between a reference potential and the input voltage $V_{in}$. One terminal of resistor 26 (R1) is coupled to the biasing input voltage source $V_{in}$ and the other terminal of resistor 27 (R2) is coupled to a reference potential such as ground. The voltage divider including resistors R1 and R2 also has a central terminal 28 connected to the positive input of operational amplifier 21. Thus as one can see, the input to the negative input of operational amplifier 21 is derived from the voltage divider which includes the RTD resistance 24. An RTD is preferred based on its linearity. However, if extremely linearity is not required, a different type of resistive element, such as a thermistor, can be employed.

RTD 24 is placed such that it produces a decreasing current draw on the inverting input of the operational amplifier 21. This current decreases as the temperature goes up. By changing the ratio of resistors 26 and 27, the offset of the output voltage of the operational amplifier 21 may be changed. In a similar manner, by changing the ratio of resistors 22 and 23, the gain with the temperature may be changed. Thus, the output voltage of operational amplifier 21 can be controlled to be proportional to 1/T for many different temperature scales and ranges.

The equation for the output of the temperature amplifier is given by the following:

$$V_{out} = R_4 \left( \frac{V_1}{RTD} + \frac{V_1 - V_{in}}{R_3} \right) \text{ where } V_1 = V_{in} \left( \frac{R_1}{R_1 + R_2} \right). \quad (1)$$

Pressure transducer 10 employed in the present invention may take the form of a piezoresistive Wheatstone bridge. Such devices are shown in the above noted patents. Also, see U.S. Pat. No. 6,530,282, which shows a device that takes an input voltage and through changes in values of its resistor legs produces an output voltage proportional to the applied pressure. It is inherently a ratiometric device. That means that the output voltage depends on the input voltage. So, as the input voltage decreases with increasing temperature, so will the output voltage. Such a device can also be compensated for temperature effects on the transducer, as for example shown in many prior art patents. See, for example U.S. Pat. No. 3,245,252 entitled "Temperature Compensated Semiconductor Strain Gage Unit" by A. D. Kurtz et al. issued on Apr. 12, 1966 and assigned to the assignee herein.

Figure 2:
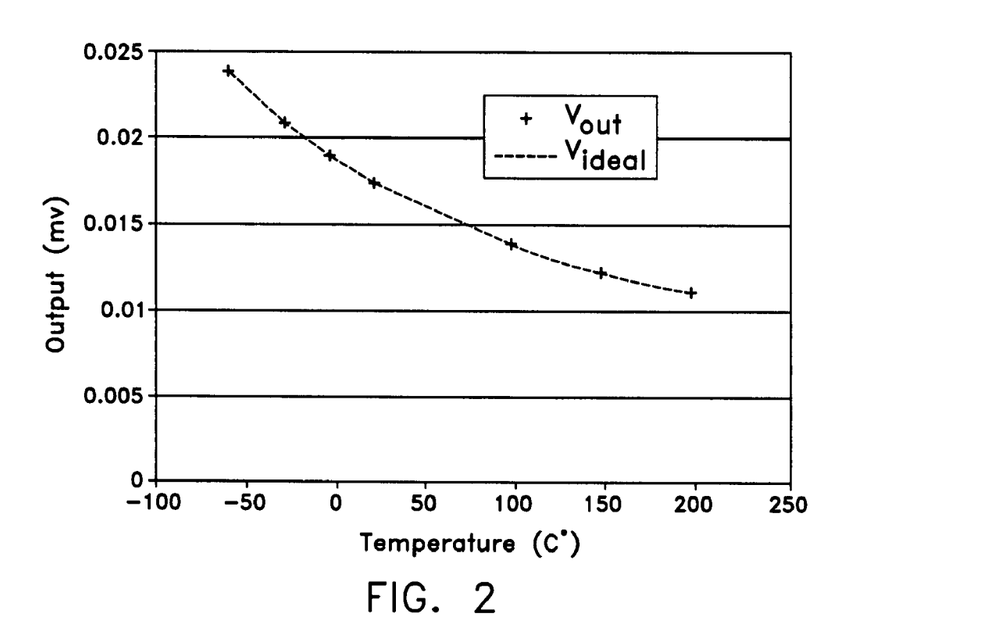
FIG. 2 is a graph depicting the output of the circuit of FIG. 1.

Referring to FIG. 2, there is shown the output of the transducer which is designated by the diamond shaped pattern as compared to the ideal curve of pressure over temperature. The ideal curve is indicated by the dashed line. It is thus apparent that the output from the transducer versus the ideal curve, match up very well. There is an unanticipated advantage which is due to the operation of the temperature amplifier 20. The circuit uses only one operational amplifier and no other active electronic devices. Because of this, it is possible to make a high temperature device. Operational amplifiers that can operate up to 400° F. are known, and a pressure transducer can operate at much higher temperatures than this. Thus, the device of FIG. 1 is capable of operating at extremely high temperatures and in harsh environments. Thus, such a device can be used in automotive applications, aircraft applications and other applications where high temperatures and harsh environments are present.

Another advantage is due to the fact that the circuit is simple, consumes very little current, and operates at a low voltage, such as 1.5 Volts DC. In this manner, the device can be employed by using a battery or in a wireless application. The device of FIG. 1 well suited for measuring leaks in harsh environments, such as a leak in a tire or on an aircraft which undergoes extreme temperature changes during flight. Tires have large temperature variations due to braking conditions and the like.

Operational amplifier 21 may take the form of a commercially available device, such as those available from many sources, including such manufacturers as Harris, Texas Instruments, Motorola, and others. As indicated, the pressure transducers may take the form of those manufactured by Kulite Semiconductor, and others.

Figure 3:
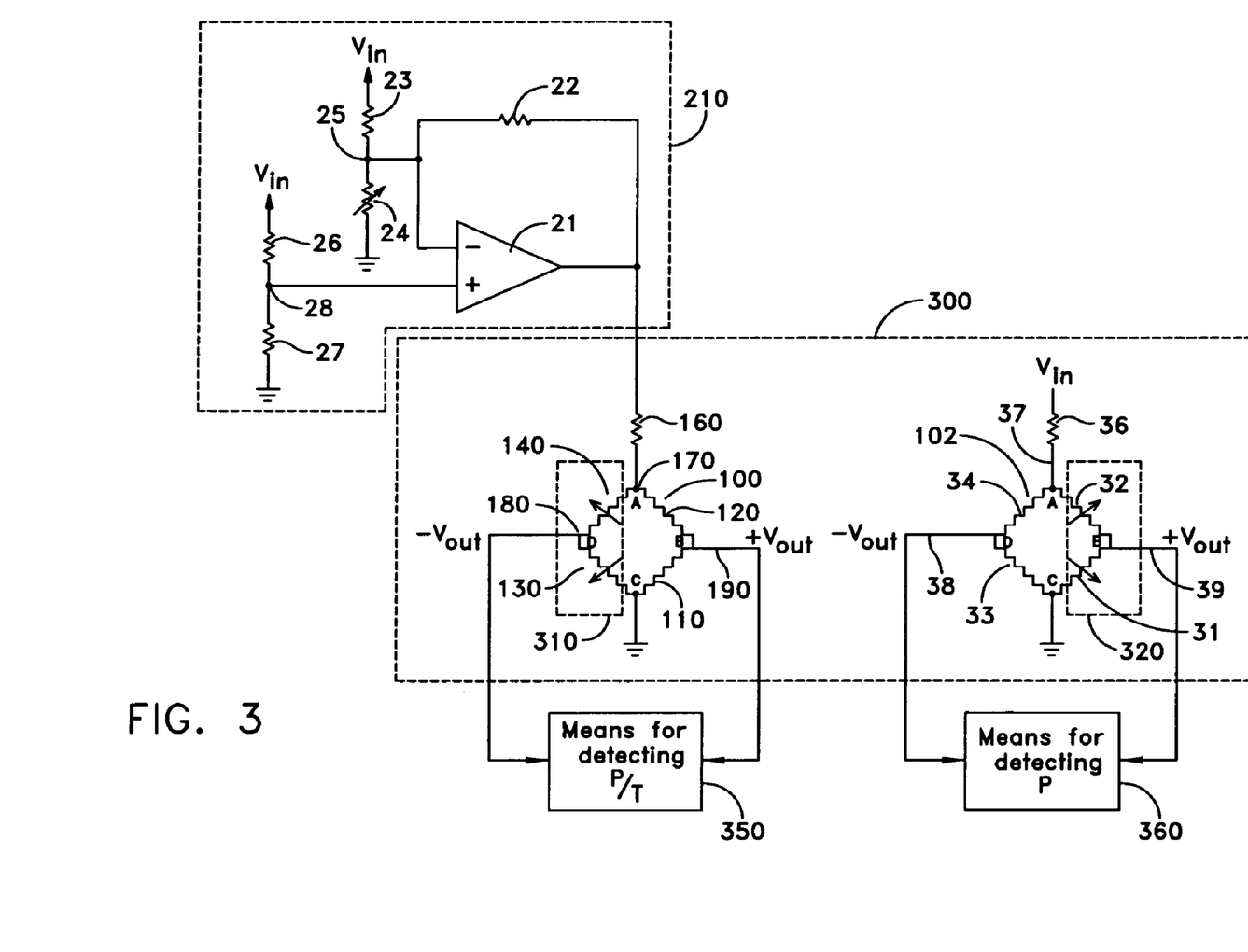
FIG. 3 is a schematic illustration of another embodiment of the present invention.

As previously indicated, some circumstances may require that despite detecting the ratio of P/T as a means of determining pressure leaks, the pressure must be determined independently. FIG. 3 illustrates an embodiment of the present invention utilizing two half-bridges (310, 320) configured on a single sensor chip 300 that are not electrically connected to one another. In one application, the present invention may be employed to detect leakage in a vessel or chamber by measuring the ratio of pressure to temperature (P/T), and also measuring the pressure (P), thus insuring that regardless of the ratio P/T, the pressure is sufficient to achieve a particular objective, such as landing an aircraft. By using fixed resistors in combination with each half-bridge, two separate outputs are provided.

More particularly, by coupling one of the half-bridge circuits (e.g. 310) to the temperature amplifier arrangement depicted in FIG. 1, outputs 180, 190 ($V_{out-}$, $V_{out+}$) proportional to P/T are obtained. The other half-bridge circuit (e.g. 320) is connected directly to the input voltage Vin to produce an output dependent only on pressure P. In this manner, an embodiment of the present invention provides for two outputs from a single sensor chip, one of which may be used to detect whether a leak exists, while the other may be used to determine whether proper pressure exists (regardless of temperature).

In a preferred embodiment, and still with reference to FIG. 3, the single pressure sensor chip 300, embodied as an integrated circuit, includes the half-bridge circuit 310 comprising variable resistors 130, 140 which resistors are coupled with two completion resistors 110, 120 (fixed or non-variable resistors) to form a bridge typology or Wheatstone bridge 100. The variable resistors 130, 140 may be piezoresistive devices deposited or otherwise formed on a semiconductor or other diaphragm and operate to change resistance according to a pressure applied to the diaphragm, as is known in the art. The sensor chip further includes resistor 160, having a terminal connected to the biasing terminal 170 of the Wheatstone bridge 100. The output from the bridge is taken between terminals 180 and 190 designated as $V_{out-}$ and $V_{out+}$, respectively.

Sensor chip 300 further includes the second half-bridge circuit 320 electrically disconnected from or otherwise isolated from half-bridge circuit 310. Circuit 320 includes variable resistors 31, 32, which are coupled with two completion resistors 33, 34 (fixed or non-variable resistors) to form a second Wheatstone bridge 102. The variable resistors 31, 32 may be piezoresistive devices deposited or otherwise formed on a semiconductor or other diaphragm and operate to change resistance according to a pressure applied to the diaphragm, as is known in the art. The sensor chip further includes resistor 36, having one terminal connected to the biasing terminal 37 of the Wheatstone bridge 102 and the other terminal connected to the input voltage Vin. The output from the bridge is taken between terminals 38 and 39 designated as $V_{out-}$ and $V_{out+}$ so as to provide an output indicative of the pressure applied thereto.

The sensor chip 300 is coupled via resistor 160 to the output of operational amplifier 21 and also is connected to feedback resistor 22. The operational amplifier arrangement 210 depicted in FIG. 3 is analogous to that illustrated with respect to the circuit of FIG. 1, and like reference numerals are used to indicate like parts. The operational amplifier circuit is remote from sensor chip 300 and disposed on a circuit board (PCB), and preferably connected to the sensor chip 300 via header pins, as is known in the art. In an exemplary embodiment, resistance 24 and sensor chip 300 are disposed adjacent one another within a vessel such as a chamber of a tire, with the PCB containing the operational amplifier circuitry disposed behind 24 and chip 300 and electrically coupled thereto. The feedback resistor 22 connects the operational amplifier 21 output to the operational amplifier 21 negative input terminal as a conventional feedback resistor that in part determines the gain of the operational amplifier. The negative or inverting terminal is further coupled to a voltage divider comprising resistors 23 and resistance 24 joined at node 25. Coupled to the positive or non-inverting input terminal of operational amplifier 21 is voltage divider comprising resistors 26 and 27 joined at node 28.

One embodiment of the invention is an apparatus for measuring the pressure and the ratio of pressure and temperature which includes at least two four-terminal electrical networks such as 100, 102 each having four nodes (A, B, C, D) and each including a first resistor having a known resistance 120, 34, respectively connected between network terminals (A) and (B), a second resistor having a known resistance 110, 33, respectively connected between network terminals (B) and (C), a third resistor 140, 32, respectively having a resistance connected between network terminals (A) and (D), the resistance of said third resistor being variable in value dependent upon a pressure P and a fourth resistor 130, 31, respectively being connected across terminals (C) and (D) the resistance of said fourth resistor being variable in value dependent upon a pressure P. The apparatus additionally includes a means for impressing a source of potential, such as by way of a non limiting example operational amplifier arrangement 210, dependent upon a reciprocal of temperature T across network terminals (A) and (C) of the four terminal network 100, and means 350 for detecting a voltage dependent on the ratio of P/T connected to said network terminals (B) and (D) associated with the respective terminals (A) and (C). This means 350 monitors the output of the Wheatstone bridge 100 which provides a voltage output proportional to P/T. If the value of this ratio deviates it is detected by means 350 and an alarm or other indication is provided indicative of a leak in the monitored vessel. This is means for impressing a source of fixed potential upon across network terminals (A) and (C) such as Vin across the four terminal network 102 and means 360 for detecting a voltage dependent on P connected to network terminals (B) and (D) associated with the respective (A) and (C). The means 360 monitors the output of Wheatstone bridge 102 and provides an output proportional to pressure. The means 350 and 360 may convert the analog voltage output of the respective bridges 100 & 102 to a digital signal for further processing if desired. It is also understood that one can provide an amplifier circuit where output is proportional to T. The output T can be multiplied by P/T to obtain an output P thus eliminating the need for a second pressure transducer.

Figure 4:
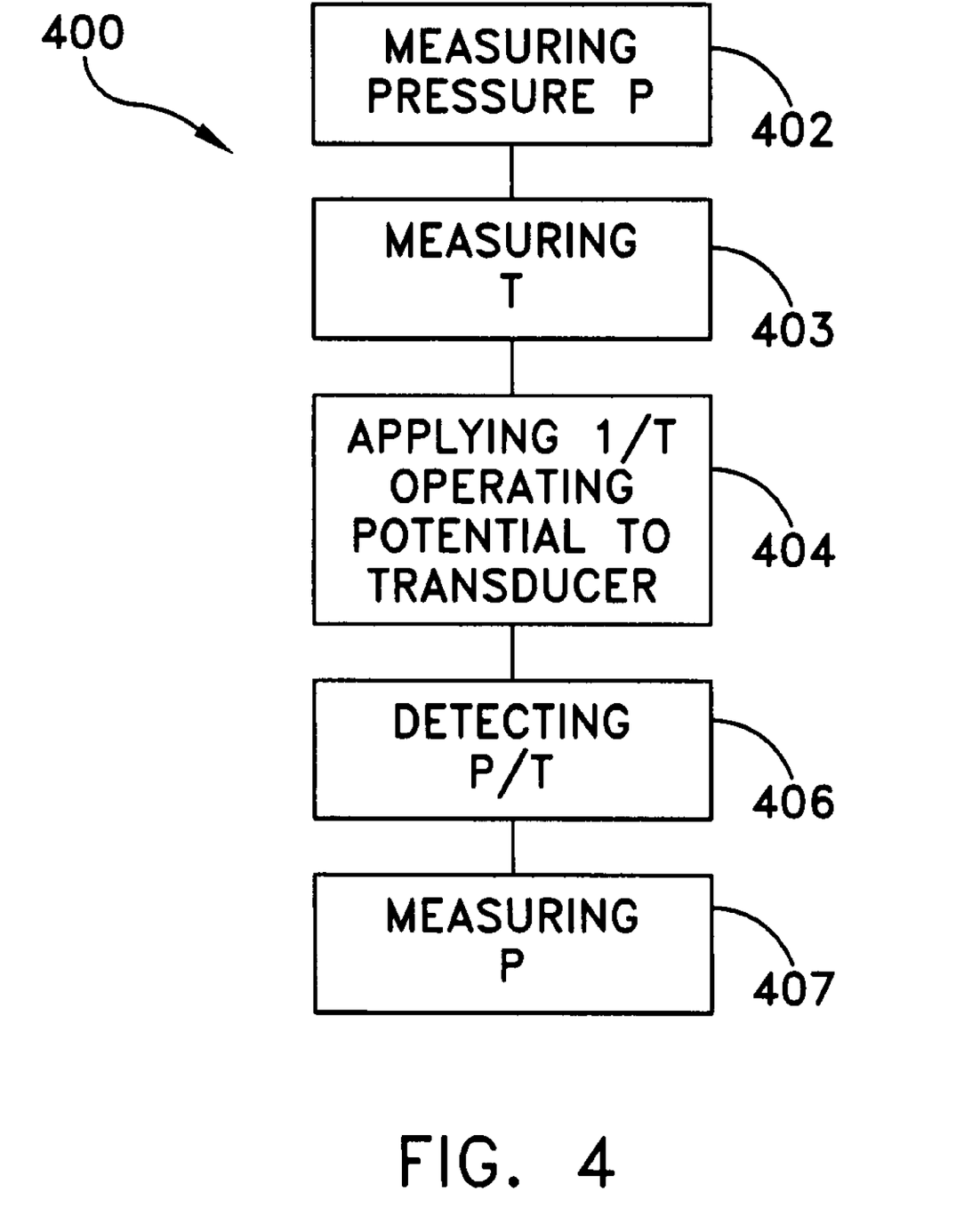
FIG. 4 is a flow chart of an embodiment of a method of the present invention.

According to another aspect of the present invention, FIG. 4 illustrates a method 400 for determining the pressure and the leakage in an enclosed vessel, such as a tire cavity, comprising the steps of measuring 402 the pressure (P) in the vessel using a pressure transducer. Method 400 also includes measuring 403 the temperature (T) in the vessel. Method 400 also includes applying 404 an operating potential to a pressure transducer proportional to (1/T) to cause the transducer to provide an output proportional to P/T. Method 400 also included detecting 406 if P/T changes as an indication of the leakage in the vessel where P/T changes. Method 400 includes measuring 407 the magnitude of P, to determine whether an objective, such as landing an aircraft, may be achieved.

Figure 5:
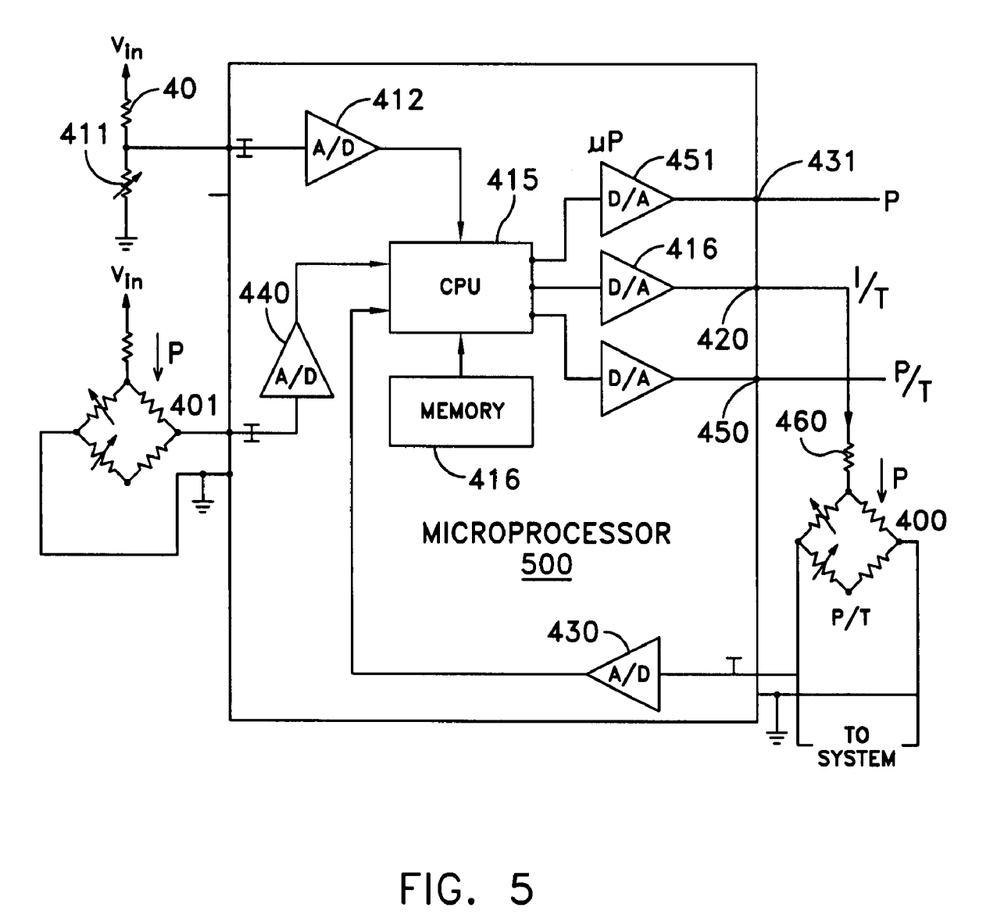
FIG. 5 is a schematic diagram depicting a microprocessor employed in conjunction with a pressure transducer to provide outputs according to this invention.

Referring to FIG. 5 there is shown a microprocessor 500. A microprocessor as will be explained can perform the function of providing an output proportional to 1/T as implemented by the above noted operational amplifier. It is immediately noted that the operational amplifier as above described is a preferred way of producing the output 1/T because of the fact that it is less expensive, it is simple to implement and it can be placed if necessary on the same circuit board as containing the pressure transducers. In any event, microprocessors are relatively inexpensive but not as inexpensive as an operational amplifier. One skilled in the art will understand that a microprocessor can produce the above-noted outputs plus other outputs as will be described. Thus, as shown in the Figure there are two pressure transducers, namely 400 and 401. Each pressure transducer as will be explained is employed in a different manner to produce the outputs P and P/T. Referring to the Figure there is shown a voltage divider consisting of a fixed resistor 410 and a temperature variable resistor 411. As indicated above the temperature variable resistance may be a RTD or a conventional temperature device such as a thermistor and so on. In any event, as seen the voltage divider goes to one input of the microprocessor. While a temperature dependent divider is shown, it is also known that the impedance of the piezoresistive bridge changes with temperature and therefore a fixed resistor in series with the bridge as resistor 460 provides a voltage across the terminals proportional to T. See U.S. Pat. No. 4,192,005 referenced below. As is well known, microprocessors have multiple inputs and outputs which basically are real time input/output terminals. The terminal of the voltage divider goes to the input of the microprocessor where the voltage is converted by means of an analog to digital converter 412 to a digital signal and directed to the CPU 415 of the microprocessor. The CPU 415 is conventionally coupled to memory 416 as well as index registers and other hardware devices which are not shown. The structure of a microprocessor is well known and not considered to be part of this invention. While both the analog to digital converters and the digital to analog converters are shown as located within the microprocessor they can be located externally. Thus, as seen, the microprocessor receives an input proportional to the temperature. This is an analog voltage and again the analog voltage is converted to a digital signal by means of the analog to digital converter (A/D) 412. The CPU receives the input from the A/D converter 412 and is programmed to perform a reciprocal function. Thus, the CPU converts the voltage indicative of temperature (T) to the reciprocal or 1/T. The corresponding output is then directed to the digital to analog converter D/A 416 where this voltage is converted to an analog voltage and emanates from output terminal 420 as 1/T. The voltage 1/T is applied to the bridge biasing terminal of pressure transducer 400 which receives a pressure (P). Because of the biasing voltage of 1/T the transducer 400 produces an output of P/T. In any event, in this embodiment the output of the Wheatstone bridge inherent with the pressure transducer 400 is directed to an analog to digital converter 430 which again interfaces its output to the CPU 415. The CPU is now programmed to take the output from the analog to digital converter 412 indicative of temperature and to take the output from the analog to digital converter 430 indicative of P/T and produce an output at terminal 431 equal to pressure. Thus, the single pressure transducer incorporating a Wheatstone bridge array in conjunction with the microprocessor can receive a biasing voltage of 1/T and produce an output of P/T which output is again directed to the microprocessor causing the microprocessor to produce an output of P by multiplying P/T by T. The output P is provided at terminal 431. Also shown in FIG. 5 is another pressure transducer 401. Pressure transducer 401 also conventionally contains at least two piezoresistors in Wheatstone bridge array and produces an output analog voltage proportional to an applied pressure P. In any event, the Wheatstone bridge array associated with pressure transducer 401 is biased by a fixed predetermined voltage as $V_{in}$, and hence produces a voltage output indicative of pressure only which is P. This output goes to an analog to digital converter 440 which again goes to CPU 415. The CPU together with the appropriate programming takes the output of the analog to digital converter 412 by dividing the pressure P by T which is indicative of temperature (T) and now produces an output at terminal 450 of P/T by dividing the pressure P by T. This is the first output from the system. In a conventional manner, the output from the analog to digital converter 440 is the digital representation of pressure. This is applied to the CPU 415 which essentially transfers the digital pressure signal to the digital to analog converter 451, to produce an output P, which is again solely pressure. Thus, by use of a pressure transducer 401 which has a predetermined voltage applied to it and by the use of the voltage divider 411, one can provide in conjunction with a microprocessor a first output indicative of P/T and a second output indicative of P. In a similar manner, one can utilize the pressure transducer 400 to cause the microprocessor to produce an output biasing voltage for pressure transducer 400 of 1/T to cause pressure transducer 400 to produce an output of P/T. This output is utilized by the system as shown, but is also applied to the microprocessor and via analog to digital converter 430 and the CPU 415 provides an output at terminal 431 of P which is the second desired output.

While the above noted implementation utilizing a microprocessor is operational, it is again indicated that the use of an operational amplifier as depicted above, is a preferable embodiment and should preferably be employed. The use of microprocessors in conjunction with pressure transducers is known and reference is made to U.S. Pat. No. 4,192,005, entitled "Compensated Pressure Transducer Employing Digital Processing Techniques", issued on Mar. 4, 1980 to A. D. Kurtz and assigned to Kulite Semiconductor Products, Inc., the assignee herein. In that patent a microprocessor is shown with an input terminal of the microprocessor receiving a digital signal indicative of temperature. This digital signal operates to access a memory location at which memory location is stored various parameters necessary to compensate the pressure transducer for temperature variations. If the temperature is different, a different memory location is accessed whereby the transducer is again compensated according to the different temperature. The above noted patent as indicated is assigned to the assignee herein and is a very early showing of the use of a microprocessor in conjunction with a transducer. This compensation arrangement can also be used herein if desired and if a microprocessor is employed.

It is thus apparent that one skilled in the art upon reading this application will conceive of alternate configurations which are deemed to be encompassed in the spirit and scope of the claims appended hereto. For example, while the preferred embodiment has been described with respect to an operational amplifier circuit configuration, it is understood, in an alternative embodiment, a microprocessor can be programmed to operate in conjunction with an RTD or other such device to supply an output proportional to 1/T, which can be used to bias a pressure transducer.

What is claimed is:

1. A system for sensing at least one physical characteristic associated with an engine comprising a turbine having a plurality of blades turning inside a casing, said system comprising:
   a casing coupled with the turbine, said casing having a longitudinal port, said port extending transverse to said casing with a first end of said port opening inside said casing; and
   a pressure transducer mounted substantially adjacent to said casing, in said port, said pressure transducer facing said first end, said port communicating to said pressure transducer a first pressure in the presence of said turbine blades and a second pressure when said turbine blade is not present;
   wherein, said pressure transducer has a frequency response capability which is a multiple of the blade passing frequency, and
   a processor receiving said first and second pressure outputs to determine a clearance between said blades and casing.

2. The system of claim 1, further comprising:
   a cooling cavity substantially surrounding said pressure transducer; and
   an inlet for receiving a fluid from said engine and feeding said fluid to said cooling cavity to cool said pressure transducer.

3. The system of claim 1, wherein said pressure transducer has a frequency response of about 5 to 10 times that of the blade passing frequency.

4. The system of claim 2, wherein said engine further comprises a compressor, and said inlet is substantially adjacent to said compressor.

5. The system of claim 4, wherein said fluid is compressed air.

6. The system of claim 5, further comprising an outlet for receiving said compressed air from said cavity and expelling said compressed air.

7. The system of claim 6, wherein said outlet is external to said casing.

8. The system of claim 2, wherein said cavity is further coupled to said port.

9. The system of claim 8, wherein said inlet and port are configured such that said port has a net fluid flow into said casing.

10. The system of claim 1, wherein said signal processor comprises code for determining a turbine rotational speed responsively to said pressure transducer output.

11. The system of claim 1, wherein said signal processor comprises a memory storing data indicative to said engine.

12. A method for determining turbine blade clearance in a turbomachine comprising a plurality of radially extending blades within a stationary turbine casing, said method comprising;
   mounting at least one pressure sensing transducer on at least one interior wall within a port of said turbine casing, said pressure transducer mounted substantially adjacent to said casing;
   sensing, by said at least one pressure sensing transducer, a first pressure signal caused by an unsteady pressure field on the casing as a function of tip clearance size as a corresponding blade passes said transducer and a second pressure signal caused by a steady pressure field on the casing; and
   determining a clearance between said casing and said plurality of blades dependent upon said first and second pressure signals, wherein said pressure transducer has a frequency response capability which is a multiple of the blade passing frequency.

13. The method of claim 12, wherein said pressure transducer has a frequency response of about 5 to 10 times that of the blade passing frequency.

14. The method of claim 12, further comprising the step of providing a first air chamber substantially adjacent an exterior wall of said port, said air chamber having an inlet port for receiving cooling air for circulation within said chamber, and an outlet port for allowing said circulated air to exit said chamber.

15. The method of claim 12, further comprising adjusting the blade tip clearance in response to said generated signal.

16. The method of claim 12, wherein said turbomachine further comprises a compressor, and said inlet is substantially adjacent to said compressor.

17. The method of claim 14, wherein said cooling air is around 1300° F.

18. The method of claim 14, wherein said outlet is external to said casing.

19. The method of claim 14, wherein said inlet and said port are configured such that said port has a net air flow into said casing.

20. The method of claim 12, further comprising coupling a signal processor to said pressure sensing transducer.

21. The method of claim 20, wherein said signal processor comprises code for determining a turbine rotational speed responsively to said output.

22. The method of claim 21, wherein said signal processor comprises a memory storing data indicative of said turbomachine.

23. An engine system comprising:
   a compressor, a combustion area and turbine, said turbine having a plurality of blades turning inside a casing;
   a port in said turbine casing; and
   a pressure sensor coupled substantially adjacent to said casing and including at least one output; said pressure sensor mounted in said port wherein a first pressure indicative of a clearance between said turbine blades and said casing and a second pressure indicative of an ambient pressure is communicated to said pressure sensor through said port;
   wherein said pressure sensor has a frequency response capability which is a multiple of the blade passing frequency; and
   a processor for receiving said first and second pressures and determining a clearance between said blades and cases based on said received pressures.

24. The engine of claim 23, wherein said pressure transducer has a frequency response of about 5 to 10 times that of the blade passing frequency.

25. The engine of claim 24, further comprising:
   a cooling cavity substantially surrounding said pressure sensor, and
   an inlet for receiving compressed fluid from said compressor and feeding said compressed fluid to said cooling cavity to cool said pressure sensor.

26. The engine of claim 25, wherein said compressed fluid comprises air.

* * * * *

UNITED STATES PATENT AND TRADEMARK OFFICE
CERTIFICATE OF CORRECTION

PATENT NO. : 7,530,274 B2
APPLICATION NO. : 11/512469
DATED : May 12, 2009
INVENTOR(S) : Anthony D. Kurtz et al.

It is certified that error appears in the above-identified patent and that said Letters Patent is hereby corrected as shown below:

Delete claims 1-26 col. 9 and 10 and insert the following claims therefor:

--1. Apparatus for producing an electrical output proportional to a pressure and a ratio of a pressure (P) and a temperature (T) comprising:

first and second pressure transducers operative to provide an output voltage when biased by an operating potential, with said output voltage indicative of an applied pressure (P);

a circuit for applying an operating potential to said first transducer inversely proportional to a temperature T, to cause said first transducer to provide an output directly proportional to P/T; and said second pressure transducer when receiving a predetermined operating potential producing an output proportional to said applied pressure (P), whereby there is provided a first output proportional to P/T and a second output proportional to P.

2. The apparatus according to claim 1, wherein the circuit comprises a microprocessor.

3. The apparatus according to claim 1, wherein the circuit comprises an amplifier having an output proportional to 1/T.

4. The apparatus according to claim 1, wherein the first and second transducers comprise a bridge resistor network.

5. The apparatus according to claim 1, wherein said first and second transducers each include a resistive array with each array including at least one resistor whose resistance varies according to an applied pressure.

6. The apparatus according to claim 5, wherein each array is a Wheatstone bridge array having at least one piezoresistor whose resistance varies according to an applied pressure.

7. The apparatus according to claim 3, wherein said amplifier is an operational amplifier, having an inverting and non-inverting input and an output.

8. Apparatus for measuring the pressure and the ratio of pressure and temperature which comprises:

a first and a second two four-terminal electrical network each having four nodes (A, B, C, D) including a first resistor having a known resistance connected between network terminals (A) and (B), a second resistor having a known resistance connected between

UNITED STATES PATENT AND TRADEMARK OFFICE
CERTIFICATE OF CORRECTION

PATENT NO.       : 7,530,274 B2
APPLICATION NO.  : 11/512469
DATED            : May 12, 2009
INVENTOR(S)      : Anthony D. Kurtz et al.

It is certified that error appears in the above-identified patent and that said Letters Patent is hereby corrected as shown below:

network terminals (B) and (C), a third resistor having a resistance connected between network terminals (A) and (D), the resistance of said third resistor being variable in value dependent upon a pressure P and a fourth resistor being connected across terminals (C) and (D) the resistance of said fourth resistor being variable in value dependent upon an applied pressure P said networks operative to provide an output voltage where biased by a suitable source of operating potential, means for impressing a first source of operating potential dependent upon a reciprocal of temperature T across network terminals (A) and (C) of said first terminal network and means for detecting a voltage dependent on the ratio of P/T connected to said network terminals (B) and (D) of said first terminal network; and means for impressing a source of a fixed operating potential across network terminals (A) and (C) of said second four terminal network; and means for detecting a voltage dependent on P connected to said network terminals (B) and (D) associated with (A) and (C) of said second terminal network.

9. The apparatus according to claim 8, wherein said means for applying an operating potential to said first transducer includes an operational amplifier having an inverting and non-inverting input terminal and an output terminal, a first voltage divider having a temperature variable device coupled to said inverting terminal, said variable device providing a resistance proportional to temperature (T), to cause said first divider to provide a voltage proportional to temperature and a second voltage divider coupled to said non-inverting terminal, a feedback resistor coupled from said output terminal to said inverting terminal to cause said amplifier to provide an output voltage proportional to 1/T.

10. The apparatus according to claim 9, wherein said temperature variable device is an RTD.

11. An apparatus for determining the leakage and the pressure in a vessel comprising:

a first pressure transducer coupled to said vessel; said first pressure transducer including a first bridge array including at least one resistor whose resistance varies according to an applied pressure, said transducer when biased by an operating potential providing an output voltage, means for applying an operating potential proportional to (1/T) to the biasing terminal of said first transducer, to cause transducer to provide an output of P/T; and

UNITED STATES PATENT AND TRADEMARK OFFICE
CERTIFICATE OF CORRECTION

| | |
|---|---|
| PATENT NO. | : 7,530,274 B2 |
| APPLICATION NO. | : 11/512469 |
| DATED | : May 12, 2009 |
| INVENTOR(S) | : Anthony D. Kurtz et al. |

It is certified that error appears in the above-identified patent and that said Letters Patent is hereby corrected as shown below:

a second transducer coupled to said vessel said second transducer including a second bridge array also including at least one resistor whose resistance varies according to an applied pressure when biased by an operating potential to provide an output voltage, means for applying a predetermined bias to said second transducer to cause said transducer to provide an output of P.

12. The apparatus according to claim 11, wherein each of said first and second pressure transducers includes a Wheatstone bridge array including two piezoresistor in series in one arm of said bridge and two fixed resistors in the other arm of said bridge.

13. The apparatus according to claim 12, wherein said means for applying an operating potential to said first transducer includes an operational amplifier having an inverting and non-inverting input terminal and an output terminal, a first voltage divider having a temperature variable device coupled to said inverting terminal, said variable device providing a resistance proportional to temperature (T), and a second voltage divider coupled to said non-inverting terminal, a feedback resistor coupled from said output terminal to said inverting terminal to cause said amplifier to provide an output voltage proportional to 1/T.

14. The apparatus according to claim 13, wherein said temperature variable device is an RTD.

15. The apparatus according to claim 14, wherein said variable resistor is a semiconductor piezoresistor.

16. Apparatus for producing a first output proportional to a monitored pressure (P) and a second output proportional to P/T, comprising:

pressure transducer means operative when biased by a predetermined voltage source to provide an output voltage proportional to an applied pressure, said pressure transducer having a biasing potential terminal for receiving an operating potential, means coupled to said operating biasing terminal for applying an operating potential thereto proportional to 1/T to cause said pressure transducer to provide a first output proportional to P/T.

17. The apparatus according to claim 15, wherein said pressure transducer includes a Wheatstone bridge array having two piezoresistor in one arm of said bridge and two fixed resistors in said other arm.

UNITED STATES PATENT AND TRADEMARK OFFICE
CERTIFICATE OF CORRECTION

PATENT NO. : 7,530,274 B2
APPLICATION NO. : 11/512469
DATED : May 12, 2009
INVENTOR(S) : Anthony D. Kurtz et al.

It is certified that error appears in the above-identified patent and that said Letters Patent is hereby corrected as shown below:

18. The apparatus according to claim 17, wherein said means coupled to said operating biasing terminal includes a microprocessor.

19. The apparatus according to claim 18, wherein said microprocessor provides both the output P/T and the output P.

20. A method for determining the leakage and the pressure in a vessel comprising the steps of:

positioning a first and a second resistive pressure transducer in said vessel;

measuring the temperature (T) in the vessel;

applying an operating potential to said first pressure transducer proportional to (1/T) to cause the first transducer to provide an output proportional to P/T; and measuring the pressure (P) in said vessel by said second pressure transducer to cause said second transducer to provide an output proportional to P, detecting if P/T changes as an indication of the leakage in the vessel, and if P/T changes then considering the magnitude of P to determine whether an aircraft landing may be achieved.--

Signed and Sealed this

First Day of December, 2009

David J. Kappos
*Director of the United States Patent and Trademark Office*